(12) United States Patent
Choi et al.

(10) Patent No.: US 11,677,972 B2
(45) Date of Patent: Jun. 13, 2023

(54) IDENTIFYING TILE FROM NETWORK ABSTRACTION UNIT HEADER

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 36 days.

(21) Appl. No.: 17/459,242

(22) Filed: Aug. 27, 2021

(65) Prior Publication Data

US 2021/0392359 A1 Dec. 16, 2021

Related U.S. Application Data

(63) Continuation of application No. 16/403,799, filed on May 6, 2019, now Pat. No. 11,140,403.

(60) Provisional application No. 62/783,152, filed on Dec. 20, 2018.

(51) Int. Cl.
*H04N 19/44* (2014.01)
*H04N 19/176* (2014.01)
*H04N 19/129* (2014.01)
*H04N 19/70* (2014.01)

(52) U.S. Cl.
CPC .......... *H04N 19/44* (2014.11); *H04N 19/129* (2014.11); *H04N 19/176* (2014.11); *H04N 19/70* (2014.11)

(58) Field of Classification Search
CPC .... H04N 19/176; H04N 19/11; H04N 19/186; H04N 19/593; H04N 19/105; H04N 19/197; H04N 19/436; H04N 19/13; H04N 19/167; H04N 19/174; H04N 19/184; H04N 19/44; H04N 19/136; H04N 19/159; H04N 19/46; H04N 19/463; H04N 19/70; H04N 13/139; H04N 13/161; H04N 13/178; H04N 19/00; H04N 19/119; H04N 19/132; H04N 19/196; H04N 19/20; H04N 19/30; H04N 19/33; H04N 19/51; H04N 19/59; H04N 19/60; H04N 19/80; H04N 19/96;
(Continued)

(56) References Cited

U.S. PATENT DOCUMENTS

| 10,390,024 B2 | 8/2019 | Auyeung et al. |
| 2013/0057646 A1 | 3/2013 | Chen et al. |
| 2013/0101035 A1 | 4/2013 | Wang et al. |

(Continued)

FOREIGN PATENT DOCUMENTS

| WO | 2014001573 A1 | 1/2014 |
| WO | 2015009712 A1 | 1/2015 |
| WO | 2018011042 A1 | 1/2018 |

OTHER PUBLICATIONS

Written Opinion in International Application No. PCT/US2019/067487, dated Jan. 31, 2020.

(Continued)

*Primary Examiner* — Nathnael Aynalem
(74) *Attorney, Agent, or Firm* — Sughrue Mion, PLLC

(57) ABSTRACT

A method and apparatus for video decoding includes decoding a binary coded syntax element carrying an identification of a picture segment in a high level syntax structure comprising fixed length codewords and reconstructing the picture segment.

13 Claims, 9 Drawing Sheets

(58) Field of Classification Search
CPC ..... H04N 21/23412; H04N 21/234327; H04N 21/2353; H04N 21/816
USPC ........................................ 375/240.01–240.29
See application file for complete search history.

(56) References Cited

U.S. PATENT DOCUMENTS

| | | | |
|---|---|---|---|
| 2014/0010277 A1 | 1/2014 | Wang et al. | |
| 2014/0092994 A1* | 4/2014 | Wang | H04N 19/40 375/240.26 |
| 2014/0093180 A1 | 4/2014 | Esenlik et al. | |
| 2014/0211849 A1 | 7/2014 | Deshpande | |
| 2014/0301464 A1 | 10/2014 | Wu et al. | |
| 2015/0063466 A1 | 3/2015 | Sakurai et al. | |
| 2015/0078455 A1 | 3/2015 | Rusert | |
| 2015/0350659 A1* | 12/2015 | Auyeung | H04N 19/33 375/240.26 |
| 2016/0156917 A1* | 6/2016 | Ugur | H04N 19/30 375/240.08 |
| 2016/0234517 A1* | 8/2016 | Samuelsson | H04N 19/187 |
| 2017/0289556 A1 | 10/2017 | Hendry et al. | |
| 2018/0220161 A1 | 8/2018 | Schierl et al. | |
| 2019/0166376 A1* | 5/2019 | Thomas | H04N 19/88 |

OTHER PUBLICATIONS

International Search Report in International Application No. PCT/US2019/067487, dated Jan. 31, 2020.

"SHVC / MV-HEVC HLS: On motion and inter-layer constrained tile set SEI messages" Joint Collaborative Team on Video Coding (JCT-VC) of ITU-T SG 16 WP 3 and ISO/IEC JTC 1/SC 29/WG 11 15th Meeting: Geneva, CH, Oct. 23, 2013-Nov. 1, 2013 , Document: JCTVC-O0255, Document: JCT3V-F0085, 4 pages.

"Tiles" scanJoint Collaborative Team on Video Coding (JCT-VC) of ITU-T SG16 WP3 and ISO/IEC JTC1/SC29/WG11 6th Meeting: Torino, IT, Jul. 14-22, 2011, Document: JCTVC-F335, 15 pages.

"Slice Prefix for sub-picture and slice level HLS signalling" Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, Document: JCTVC-J0255, 12 pages.

Extended European Search Report dated Sep. 16, 2022 in European Application No. 19898513.7.

Schierl et al., "Slice Prefix for sub-picture and slice level HLS signalling", Joint Collaborative Team on Video Coding (JCT-VC) of ITU-T SG 16 WP 3 and ISO/IEC JTC 1/SC 29/WG 11, JCTVC-J0255, 10th Meeting, Stockholm, SE, Jul. 11-20, 2012 (12 pages total).

Choi et al., "AHG12: On tile group identification for VVC", Joint Video Experts Team (JVET) of ITU-T SG 16 WP 3 and ISO/IEC JTC 1/SC 29/WG 11, JVET-M0155, 13th Meeting: Marrakech, MA, Jan. 9-18, 2019 (3 pages total).

Office Action dated Jun. 14, 2022 issued by the Japanese Patent Office in Japanese Application No. 2021-529820.

Alexander Gabriel et al., "AHG17: On signaling of tile group set with MCTS properties (NAL unit header and new parameter set)", Joint Video Experts Team (JVET) of ITU-T SG 16 WP 3 and ISO/IEC JTC 1/SC 29/WG 11 13th Meeting, 2019, JVET-M0537, pp. 1-6 (7 pages total).

* cited by examiner

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| ... | | |
| } | | |

101

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

IDENTIFYING TILE FROM NETWORK ABSTRACTION UNIT HEADER

CROSS-REFERENCE TO RELATED APPLICATION

This application is a Continuation of U.S. patent application Ser. No. 16/403,799, filed May 6, 2019 in the United States Patent & Trademark Office, which claims priority under 35 U.S.C. § 119 to U.S. Provisional Application No. 62/783,152, filed Dec. 20, 2018 in the United States Patent & Trademark Office, the disclosures of which are incorporated herein by reference in their entireties.

FIELD

The disclosed subject matter relates to video coding and decoding, and more specifically, to the inclusion of tile identifying information in a fixed-length codepoint, high level syntax structure such as the Network Abstraction Layer unit header.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

The concept of dividing a coded video bitstream into packets for transportation over packet networks has been in use for decades. Early on, video coding standards and technologies were in their majority optimized for bit-oriented transport, and defined bitstreams. Packetization occurred in system layer interfaces specified, for example, in Real-time Transport Protocol (RTP) payload formats. With the advent of Internet connectivity suitable for mass-use of video over the Internet, the video coding standards reflected that prominent use case through the conceptual differentiation of a video coding layer (VCL) and a network abstraction layer (NAL). NAL units were introduced in H.264 in 2003, and have been retained in certain video coding standards and technologies since then with only slight modifications.

A NAL unit can, in many cases, be seen as the smallest entity on which a decoder can act upon without necessarily having decoded all preceding NAL units of a coded video sequence. Insofar, NAL units enable certain error resilience technologies as well as certain bitstream manipulation techniques, to include bitstream pruning, by Media Aware Network Elements (MANEs) such as Selective Forwarding Units (SFUs) or Multipoint Control Units (MCUs).

FIG. 1 depicts relevant parts of the syntax diagram of NAL unit headers in accordance with H.264 (101) and H.265 (102), in both cases without any of their respective extensions. In both cases, the "forbidden_zero_bit" is a zero bit used for start code emulation prevention in certain system layer environments. The "nal_unit_type syntax" element refers to the type of data a NAL unit carries, which can be, for example, one of certain slice types, parameter set types, Supplementary Enhancement Information (SEI) message, and so on. The H.265 NAL unit header further comprises "nuh_layer_id" and "nuh_temporal_id_plus1," which indicate the spatial/SNR and temporal layer of a coded picture to which the NAL unit belongs.

It can be observed that the NAL unit header includes only easily parseable fixed length codewords, that do not have any parsing dependency to other data in the bitstream such as, for example, other NAL unit headers, parameter sets, and so on. As NAL unit headers are the first octets in a NAL unit, MANEs can easily extract them, parse them, and act on them. Other high level syntax elements, for example slice or tile headers, in contrast, are less easily accessible to MANEs as they may require keeping parameter set context and/or the processing of variable length or arithmetically coded codepoints. However, even structures such as tile group headers could be designed to have properties that makes them easily accessible to MANEs, though existing video compression technologies and standards may not have done so.

It can further be observed that the NAL unit headers as shown in FIG. 1 do not include information that can associate a NAL unit to a segment of the coded picture, such as a slice, tile, or similar part of the bitstream representing a spatial area of the coded picture. In the related art, such information is present in the slice header, in certain cases in the form of a macroblock or CU address. That address, in some cases, is an integer number n indicating that a segment, slice, tile, starts at the n-th macroblock/CU in scan order when counting from the top-left of the picture. Accordingly, n can be dependent on both picture and macroblock/CU size, and can be small (e.g., fitting into 8 bits in binary code) for small picture sizes or large (e.g., 32400, requiring 16 bits in binary code); in both cases a macroblock/CU size of 16×16 samples is assumed.

Historically, picture segments such as tiles or slices were used mostly to facilitate bitstream partitioning to match Maximum Transfer Unit size constraints, and parallelization. In both cases, an identification of a tile or slice in a MANE, SFU, or similar device was normally not required. Decoders can obtain the relevant information from the, comparatively complex, slice header and/or similar information, in conjunction with state obtained from the decoding of parameter sets.

However, more recently, picture segments and especially tiles (and tile groups, which are a collection of tiles in scan order, rectangular order, or any other suitable order) have been used for purposes such as the collecting of CUs representing certain views in composed 360 projections, among other applications. In some of those applications, MANEs and SFUs can advantageously remove certain tiles or other segments from a coded picture when not required for an application. For example, when a cube projection is in use, rendering the scene from an outside viewpoint requires at most three of the six cube surfaces. Transmitting, to an endpoint, the CUs and segments representing the remaining minimum three surfaces can be a waste of resources. However, in scenarios where a sender may send a full representation (including all six surfaces of a cube projection) to a MANE, and the MANE forwards only the required subset to potentially multiple receivers, and where that required subset may differ from receiver to receiver, the MANE would tailor potentially different bitstreams containing potentially different cube surfaces for each receiver. Doing so, at present, requires the MANE to handle the complex variable length coded slice header as well as keeping state in the form of parameter sets and the like, as required to decode the slice header.

SUMMARY

Disclosed are techniques for the inclusion of a tile identification in a syntax structure comprising fixed length codewords in a video codec, to permit improved identification of tiles based on the syntax structure.

A method for video decoding includes decoding a binary coded syntax element carrying an identification of a picture segment in a high level syntax structure comprising fixed length codewords; and reconstructing the picture segment.

A device for decoding a video sequence, includes at least one memory configured to store program code; at least one processor configured to read the program code and operate as instructed by the program code, the program code including: decoding code configure to cause the at least one processor to decode a binary coded syntax element carrying an identification of a picture segment in a high level syntax structure comprising fixed length codewords; and reconstructing code configured to cause the at least one processor to reconstruct the picture segment.

A non-transitory computer-readable medium storing instructions, the instructions comprising: one or more instructions that, when executed by one or more processors of a device, cause the one or more processors to: decode a binary coded syntax element carrying an identification of a picture segment in a high level syntax structure comprising fixed length codewords; and reconstruct the picture segment.

BRIEF DESCRIPTION OF THE DRAWINGS

Further features, the nature, and various advantages of the disclosed subject matter will be more apparent from the following detailed description and the accompanying drawings in which:

FIG. 1 is a schematic illustration of NAL Unit Headers in accordance with H.264 and H.265.

PROBLEM TO BE SOLVED

Video coding syntax lacks easily identifiable/parseable syntax elements identifying a tile or other picture segment in high level syntax structures such as NAL unit headers.

DETAILED DESCRIPTION

Figure 2:
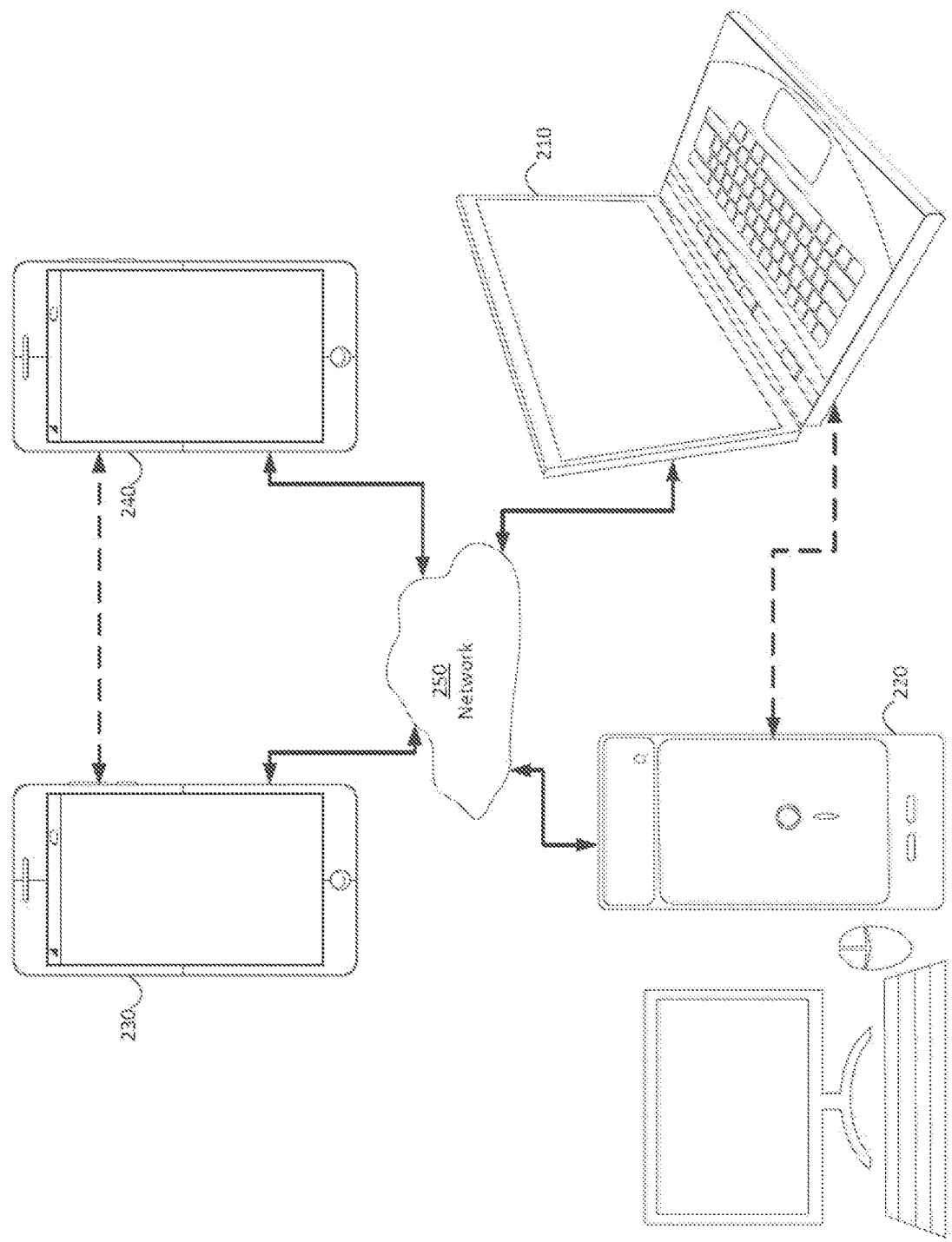
FIG. 2 is a schematic illustration of a simplified block diagram of a communication system in accordance with an embodiment.

FIG. 2 illustrates a simplified block diagram of a communication system (200) according to an embodiment of the present disclosure. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
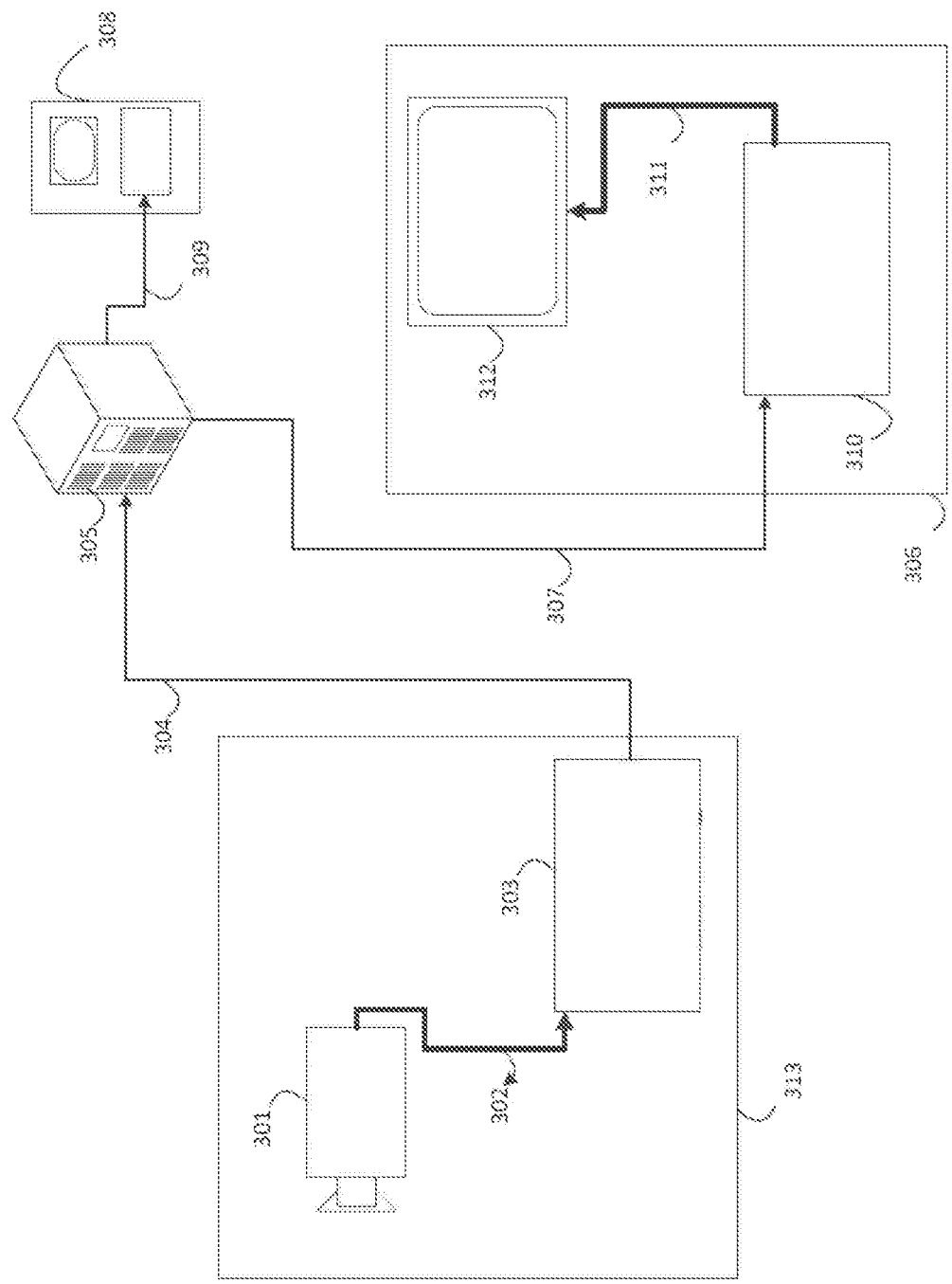
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
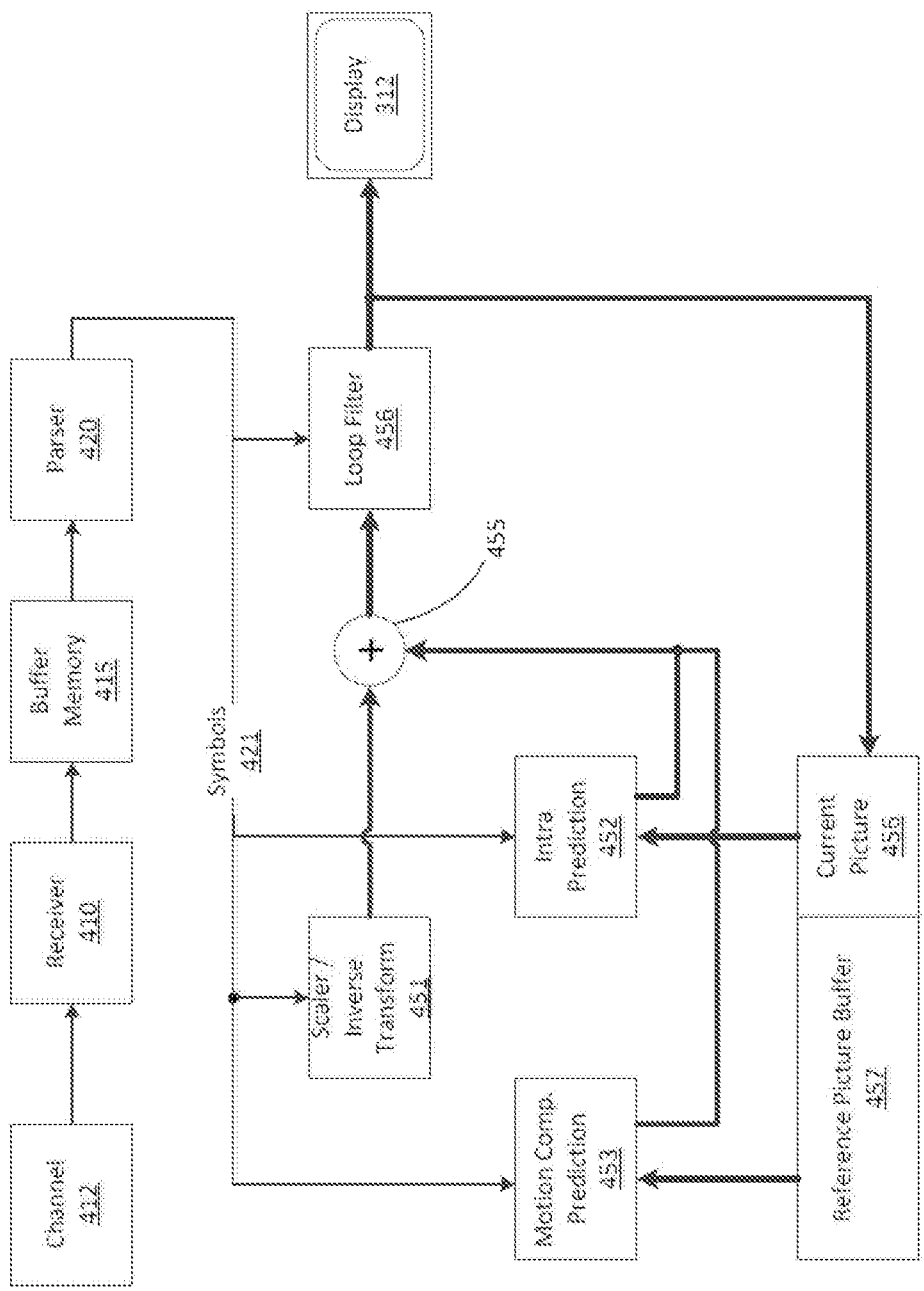
FIG. 4 is a schematic illustration of a simplified block diagram of a decoder in accordance with an embodiment.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include an parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (420) may perform entropy decoding/parsing operation on the video sequence received from the buffer (415), so to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder 420 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (420) to properly decode the data and/or to more accurately reconstruct the original video data. Additional data can be in the form of, for example, temporal, spatial, or SNR enhancement layers, redundant slices, redundant pictures, forward error correction codes, and so on.

Figure 5:
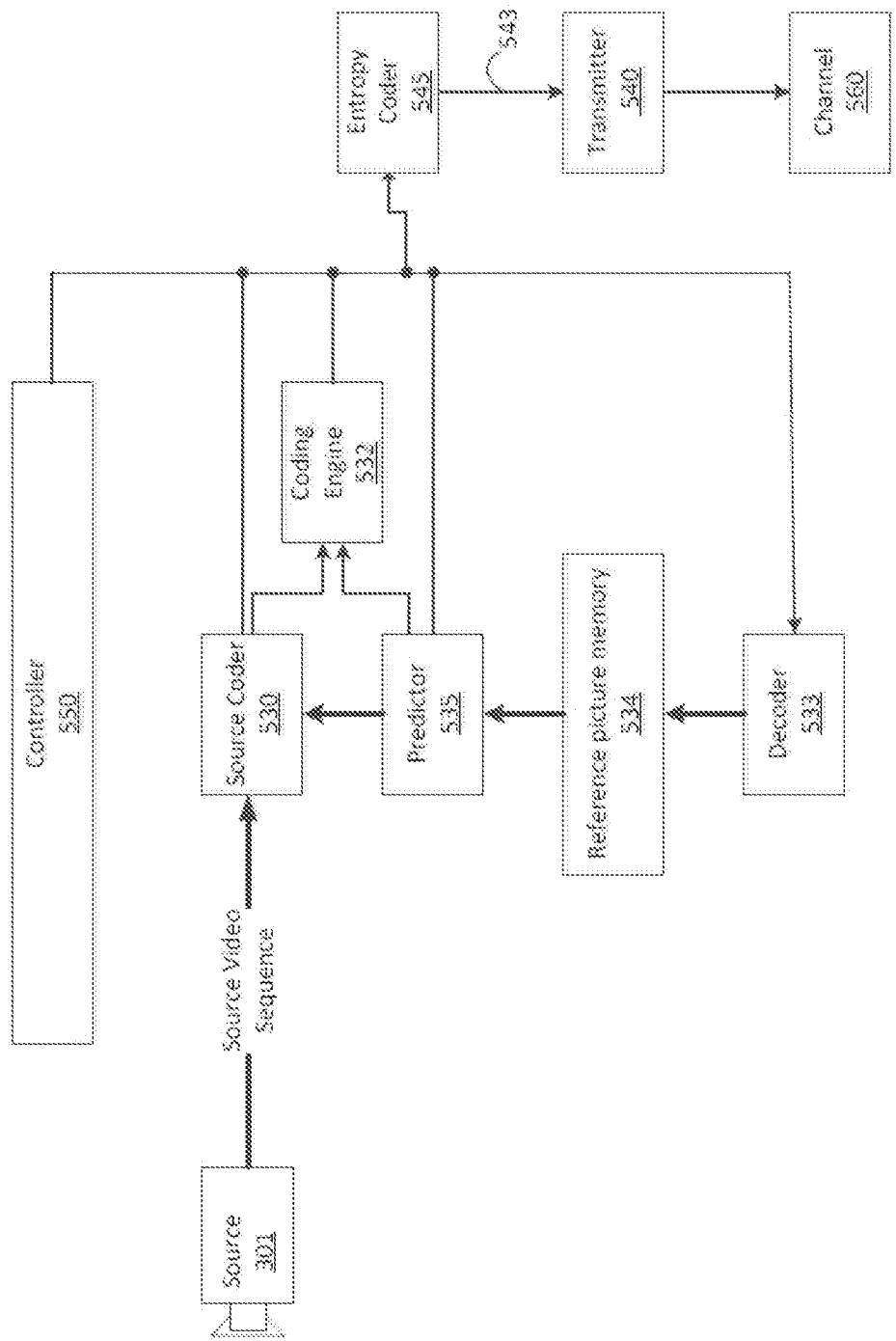
FIG. 5 is a schematic illustration of a simplified block diagram of an encoder in accordance with an embodiment.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (e.g., BT.601 Y CrCB, RGB, and/or the like) and any suitable sampling structure (e.g., Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, and/or the like), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the are readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

According to an embodiment, information identifying a picture segment such as a tile, tile group, slice, Group Of Blocks (GOB), and so forth (tile henceforth) is placed in an easily accessible high level syntax structure such as the NAL Unit Header (NUH) or similar structure comprising fixed length codewords and designed for easy processing by MANEs (NUH henceforth).

The information identifying a tile can take different forms. In designing this information, a few design considerations should be kept in mind. Some of these design considerations are listed below.

The possible number of tiles in a given picture can be small when compared to, for example the possible number of slices in legacy video coding technologies or standards. For example, in H.264, it is possible (for certain picture sizes) to have slices covering a single macroblock, allowing for as many slices as there are macroblocks. In contrast, when representing a tiled cube map, six tiles may suffice, independent of the resolution of the picture. In many practical cases, a maximum number of tiles of 64, 128, or 256 can safely be assumed.

The tile layout can be fixed and, while the video coding technology itself may allow flexibility of the tile layout from picture to picture, system standards or technologies can restrict that flexibility to the point where a tile layout remains the same throughout a session. That can allow the tile layout to be made available to a MANE through non-video bitstream specific means, such as during the session setup. An undesirable context dependency between parameter sets in the video coding and MANE operation can thereby be prohibited.

At least under the above assumptions, the mechanism to identify a tile carried by NAL unit, so as to allow the NAL unit to be removed by a MANE, can be significantly simplified when compared to related art, such as H.264 and H.265. For example, in H.264 and H.265, a MANE would have to identify the correct sequence parameter set to learn about the length of the slice/tile address codeword in the slice header. Such length information is coded as a variable length codeword in the sequence parameter set; therefore, at a minimum, a MANE would need to follow the activation sequence of parameter sets to identify the currently active sequence parameter set, and (possibly not in this order, as parameter sets are parsing-independent) decode variable length codewords to identify the length of the binary coded slice/tile address in the carried in the slice header. Then, the MANE would need to decode variable length codeword(s) in the slice header in order to obtain the starting macroblock/CU address. That information can be matched against the tile layout as decoded from the parameter sets to identify the tile.

In the same or another embodiment, the identification information for the tile can be the address of the first macroblock/CU of the tile. In effect, such a mechanism would move the starting address from the slice header to the NUH. While doing so can be a minimum change approach to the codec design, it has the disadvantage of growing the NUH significantly. However, that increase of the size of the NUH may be tolerable even from a coding efficiency viewpoint, because the same amount of bits would have been removed from the slice/tile headers.

As pointed out above, a macroblock/CU address can be reasonably small for small picture sizes and large macroblock/CU sizes, or quite large for small CU sizes and large picture sizes. For this reason, H.265's SPS contains an indication of the length of the macroblock/CU address as carried in the slice header. In the same or another embodiment, that mechanism can be retained for the NAL unit header. However, doing so can have two disadvantages. First, the context dependency established by determining the size of a syntax element in the NAL unit header through a parameter set value may require a MANE to keep track of parameter set activation, which can be tedious. Second, NAL unit headers are, at least until now, octet aligned to simplify processing in MANEs. Maintaining that octet alignment may require padding—wasting bits—in such cases where the size of the macroblock/CU address as signaled by the parameter set, in conjunction with the remaining NAL unit header syntax elements, do not add up to a number in bits divisible by 8.

In the same or another embodiment, the size of the macroblock/CU address—or any other syntax element in the NAL unit header—can be determined by other fields in the NAL unit header. This mechanism avoids the context dependency between parameter sets and NAL unit headers and may, in many cases, be preferable. The disadvantage can be the use of bits, or codepoints, in other fields of the NAL unit header. More details are provided below.

However, when not considering slices in the traditional sense, but only tiles or tile groups or similar allocation mechanisms of CUs to bitstream entities, more advanced options can be available. In order to describe those options, the term slice and tile shall briefly be reviewed. A slice can be a collection of CUs or macroblocks, normally in scan order, and identified by two factors: the starting macroblock/CU address, normally coded in the slice header, and the end of the slice, often identified by the start of a new slice (which, in turn is indicated through the presence of the next slice header). While certain video compression technologies and standards impose certain relatively minor restrictions on the number and layout of slices, in most cases, the slice layout can change from coded picture to coded picture and is often determined by mechanisms such as rate control and MTU size matching.

Tiles, on the other hand, may refer to a typically rectangular arrangement of CUs, and the size and shape of the rectangle (where that rectangular tile and other rectangular tiles, in combination make up the picture) is coded in a parameter set. In other words, a tile layout is somewhat static in that a change from one tile layout to another requires the activation of a different parameter set. Further, the number of tiles can advantageously be restricted so to enable efficient hardware implementations. The result can be that, in many video compression technologies and standards, a relatively short fixed length binary codeword of, for example, 8 bits, allows for addressing the maximum number of tiles for all picture sizes in practical use. Accordingly, a fixed length codeword for a tile ID can be used to identify a tile in a NAL unit header, thereby avoiding a parsing and context dependency between the tile-identifying NAL unit header codeword and parameter sets. Similarly, a fixed length codeword for a tile group ID can be used to identify a tile group. Of course, the mechanisms supporting a variable length codeword for macroblock/CU addresses in the NAL unit header can, if so desired, equally applied to a tile ID codeword, at the expense of similar architectural shortcomings.

Figure 6:
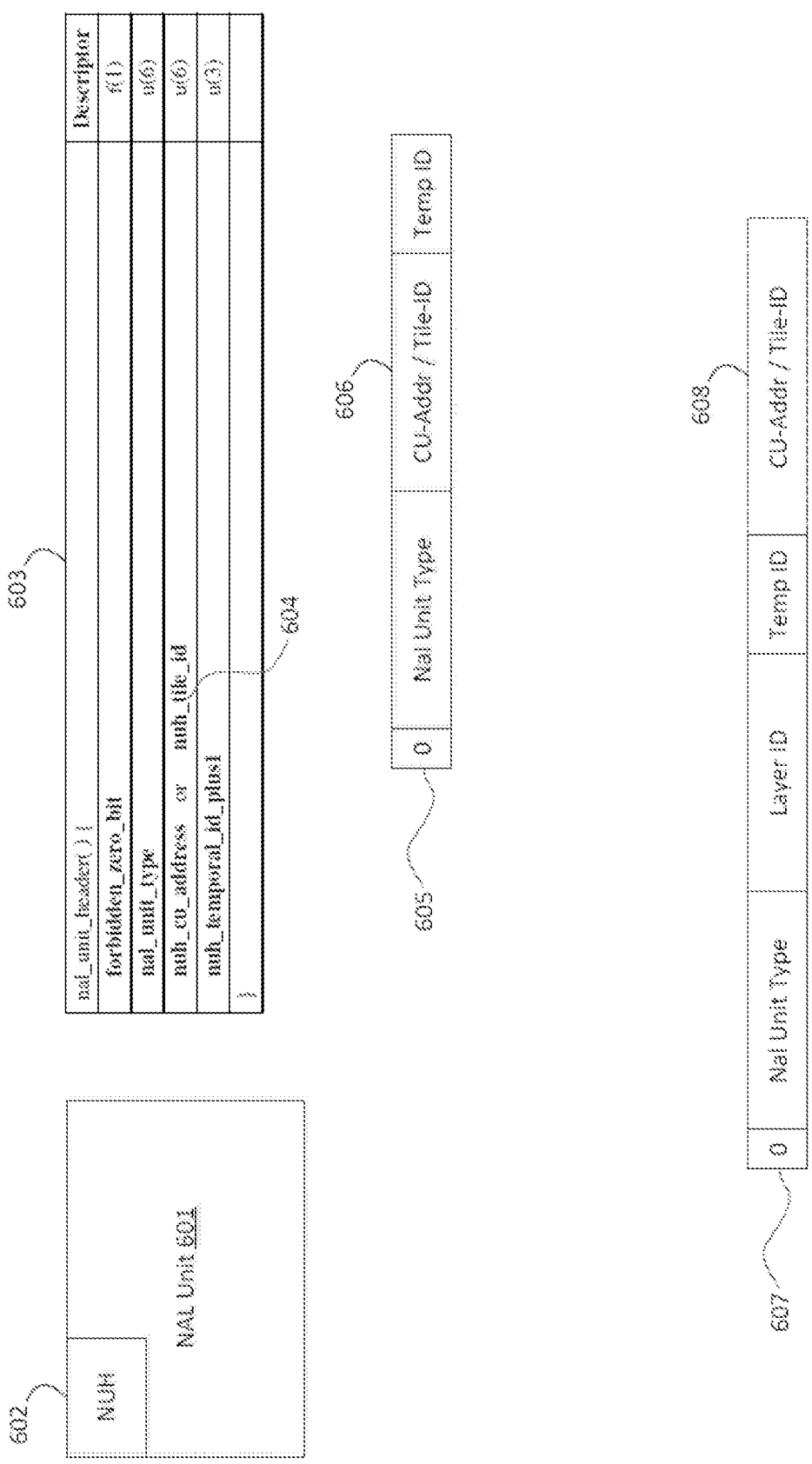
FIG. 6 is a schematic illustration of a NAL unit header comprising a CU Address or Tile ID syntax element in accordance with an embodiment.

Referring to FIG. 6, a few implementation options for a NAL unit header design are introduced.

A NAL unit (601) can be a part of a coded video bitstream. In some cases, a NAL unit is octet aligned and smaller or equal to a common Maximum Transfer Unit (MTU) size of a data network. One such common MTU size is approximately 1500 octets, which stems from certain limitations of early Ethernet technologies. A NAL unit can include a NAL unit header (602), at its beginning. The framing of NAL units inside a coded video bitstream can be through start codes, through alignment with packet structures of underlying packet oriented transport networks, and so forth.

Again referring to FIG. 6, shown is also a syntax diagram (603) of an exemplary NAL unit header, similar to the one used in H.265. The disclosed subject matter can equally be employed with NAL unit headers of similar structure, for example the NAL unit header of H.264, or VVC or any other high level syntax structure comprising fixed length codewords. In the NAL unit header (603), a syntax element CU Address or Tile ID (604) can be included. The length of that syntax element can be fixed, and can be chosen such that the NAL unit header continues to be octet aligned. The syntax element (604) can be in a format easily processable not only by video encoder and decoders, but also by MANEs. By way of example and not as a limitation, a CU address or a Tile ID (604) can be represented by an 6 bit unsigned integer, as expressed by the Descriptor u(6). In the example presented, the CU Address or Tile ID occupies the same bits that are used, in H.265, for the layer_id. A different presentation of a similar subject matter is shown with NAL unit header (605), and CU address or Tile ID (606).

Also shown is a NAL unit (607) which preserves the fields of the H.265 NAL unit header. A syntax element (608) is added at, for example, the end of the NAL unit header. The position of that syntax element is exemplary only; it may also be inserted somewhere in the middle of the other syntax elements of the NAL unit header. That syntax element can be of fixed or variable size and, when of variable size, its size can be determined by any of the mechanisms mentioned above (e.g., through a parameter set syntax element, through the NAL unit type, and/or the like), or any other appropriate mechanism.

The syntax element (608) can carry any form of picture segment identifying information; for example, a macroblock/CU address or tile identification such as a tile number, or a number denoting a tile group. The numbering range for the syntax element can be pre-determined. In case of a macroblock/CU address, the numbering range can be from 0 to the maximum number of macroblocks/CUs in the picture. For tile IDs, the numbering range can be dependent on the maximum number of tiles, which can be defined by mechanisms known to a person skilled in the art, such as, for example, profiles, levels, tiers, maximum or actual picture sizes as coded in parameter sets, and so forth. If the syntax element is present for non-tile/slice NAL units (such as parameter set NAL units, SEI NAL units, or similar, then the value of the syntax element can be restricted to a certain number, for example 0. Alternatively, the presence of the syntax element can be gated on the NAL unit type, and, thereby, the syntax element may not be present in certain NAL unit types. Alternatively, an overriding semantic other than the one described above can be assigned to the syntax element in case of certain non-tile/slice NAL unit types.

Figure 7:
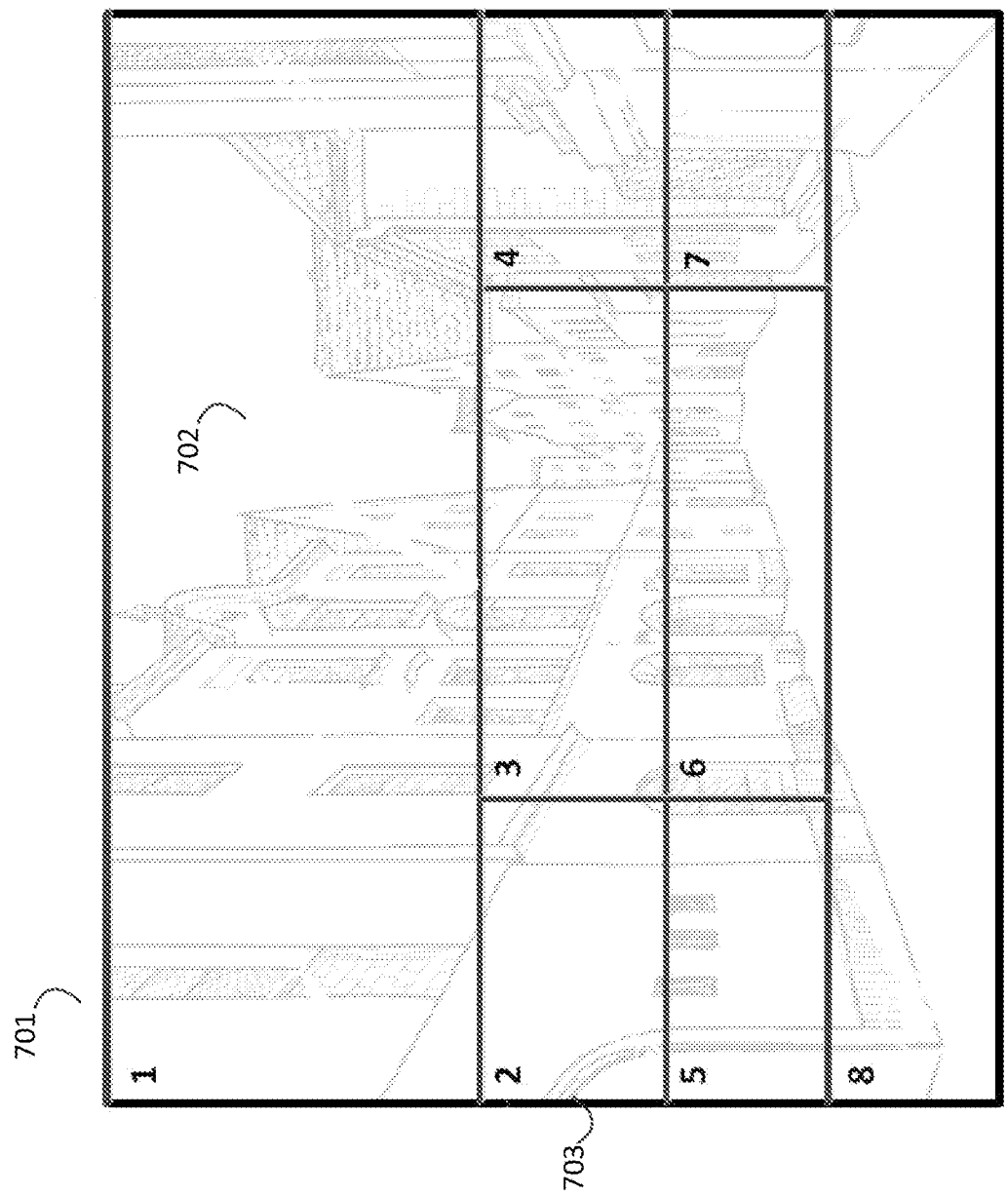
FIG. 7 is a schematic illustration of a tile layout in accordance with an embodiment.

In the same or another embodiment, a tile ID can be identified, for example, as follows. FIG. 7 shows a picture (701) in the spatial domain that is subdivided by exemplary tile layout (702) indicated through boldface lines. The tile layout presented may be representable by syntax as available in, for example H.265, or by more advanced syntax as it would be needed to represent the tile layout (702). Each tile in the tile layout can have a tile ID assigned, through any appropriate numbering mechanism but preferably through a scan order numbering of tiles. In FIG. 7, scan order tile numbering is shown through tile IDs 1 through 8; for example, the second tile in scan order has tile ID 2 (703) assigned.

An encoder can write NAL unit headers including a syntax element covering a tile ID or a macroblock/CU address populated as described above in a manner similar to writing existing NAL unit header syntax, which is known to a person skilled in the art.

A decoder or MANE can parse, from a coded video bitstream, a NAL unit header—more precisely—the syntax elements that make up the NAL unit header—in a manner known to a person skilled in the art, irrespective of the presence or absence of a syntax element carrying macroblock/CU address or tile ID or other forms of tile-identifying information. It should be noted, however, that the syntax element, in some cases as described above, may be coded without requiring state information and may be in an accessible entropy coded format, for example a fixed length, binary code. Insofar, parsing a NAL unit header according to the disclosed subject matter may not include additional burdensome operation to decoder or MANE beyond the actual presence of the syntax element tile_id itself.

In accordance with the disclosed subject matter, decoder or MANE can, however, identify a tile in a coded picture with little effort when compared to the operations required absent the disclosed subject matter. As an example, assume a decoder or MANE has been informed by external, non-video coding means, that a certain tile is not required to be reconstructed for a certain application. For example, consider the scene as shown in FIG. 7, namely a street in a village. Assume that street has been captured by a surveillance camera. Consider tile with ID 2 (703). That tile covers mostly walls; assume that the configurator of the surveillance system considers that area not relevant for surveillance. Accordingly, while the camera may be encoding all tiles, the tile with the ID 2 may not be required for the application. Accordingly, if the bitstream created by the camera were routed through one or more MANEs to its final destination, and one MANE observes bandwidth shortages and has to remove something from the bitstream, it could advantageously remove that tile as it may not be required for the application. Absent the disclosed subject matter, that would require, as a minimum, that payload of the NAL unit (slice or tile) be parsed, to the extent required, to extract the macroblock/CU address of the first macroblock in the tile, then mapping that macroblock/CU address against a tile layout (if tiles are in use). Depending on the video coding technology or standard in use, and as described above, that may require both the processing of variable length codewords and the keeping of parameter set context in the MANE; both undesirable from an implementation and computational complexity viewpoint. Instead, in the same or another embodiment, the MANE may obtain all information necessary to identify which tile is carried by the NAL unit through NAL unit header processing of binary coded codewords.

Figure 8:
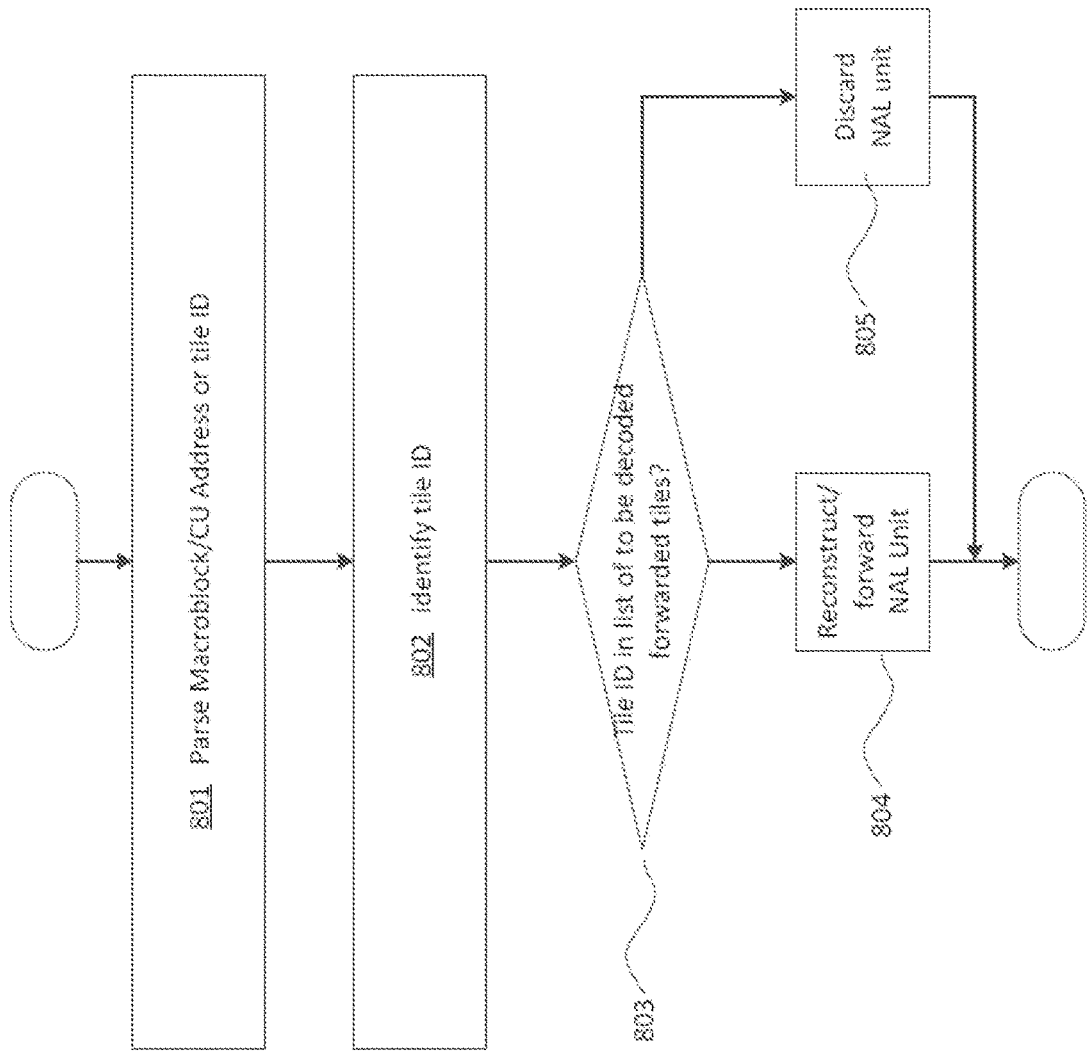
FIG. 8 is a schematic illustration of a NAL unit decoding/forwarding in accordance with an embodiment.

Referring to FIG. 8, a decoder or MANE can use the disclosed subject matter for example as follows.

The decoder may parse, from a video bitstream, a NAL unit header comprising a syntax element covering a macroblock/CU address or tile ID (801). Using that information, the decoder or MANE can identify a tile ID (802). The tile ID may be coded directly, or the decoder/MANE can match a priori information about the tile layout, as established for example by decoding parameter sets and following activation sequences, with the macroblock/CU address coded in the NAL unit header. The decoder can match (803) the tile ID against a list of tiles that require reconstruction or forwarding, by the decoder or MANE, respectively. If there is a match (803), the decoder can reconstruct, or the MANE can forward, the NAL unit carrying the tile. If, however, there is no match (804), the decoder or MANE can, possibly silently, discard the NAL unit.

The techniques for Picture Reference in Network Abstraction Unit Header described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
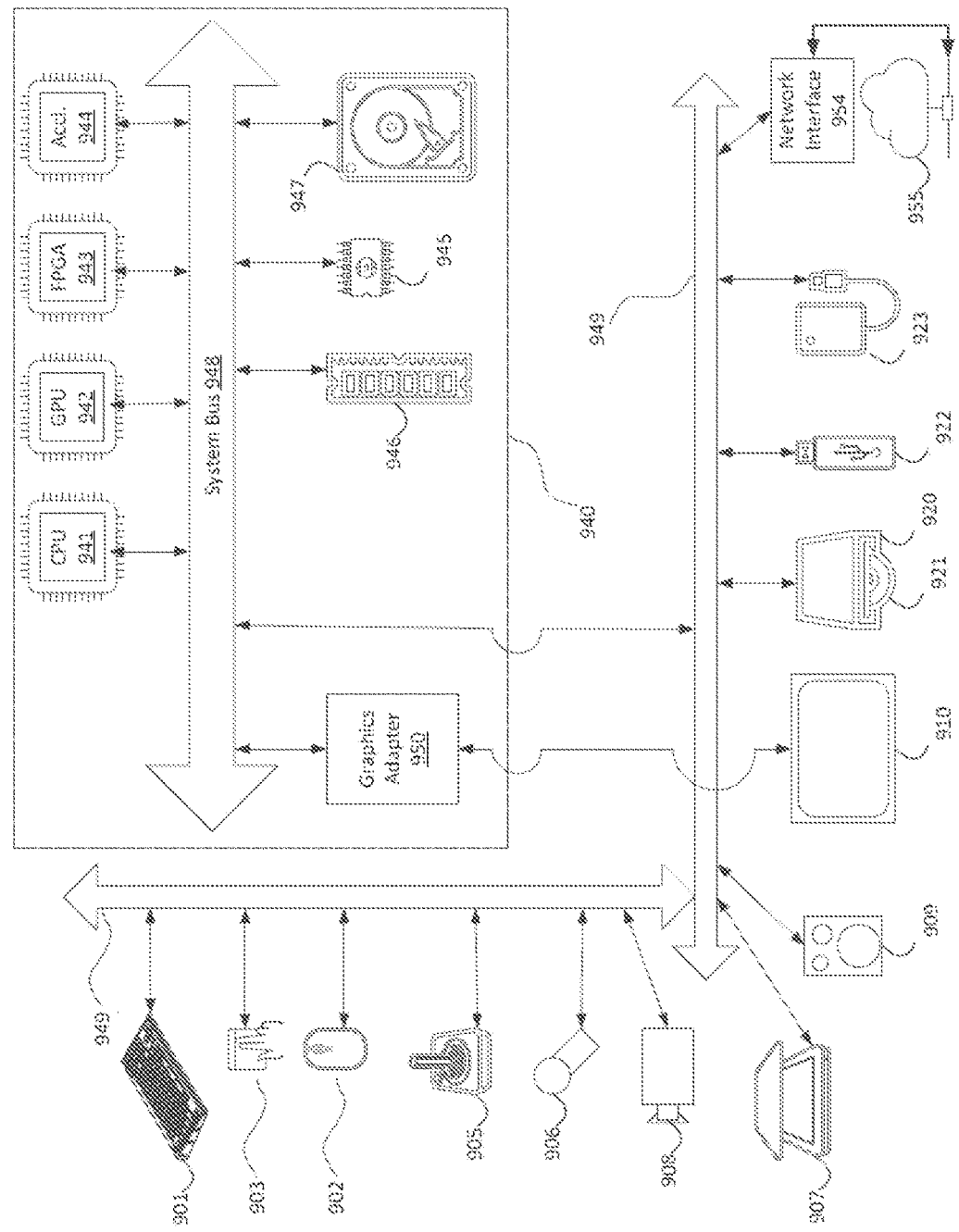
FIG. 9 is a schematic illustration of a computer system in accordance with an embodiment.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 904, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 904, or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for video decoding, the method comprising:
    decoding a binary coded coding unit (CU) address carrying an identification of a CU in a network abstraction layer (NAL) unit header comprising fixed length codewords;
    determining, based on decoding the binary coded CU address in the NAL unit header, that the CU address is included in a list of CUs to be decoded; and
    reconstructing a CU based on determining that the CU address is included in the list of CUs to be decoded,
    wherein the NAL unit header includes only a nal_unit_type syntax element that indicates a type of data that a NAL unit carries, a nuh_cu_address syntax element that indicates a CU address, and a nuh_temporal_id_plus1 syntax element that indicates a temporal layer of a coded picture to which the NAL unit belongs.

2. The method of claim 1, wherein, for a given frame, each CU in the frame has a unique CU address, and the unique CU address is assigned in accordance with a scan order of a picture segment in the frame.

3. The method of claim 2, wherein the scan order is associated with a top left corner, and is increased by one following a top-to-bottom, right-to-left order.

4. The method of claim 1, wherein the CU address is in a fixed position in the NAL unit header.

5. The method of claim 1, wherein a size of the CU address is determined through a predefined value of a high level syntax structure syntax element in the same NAL unit header.

6. The method of claim 1, wherein a size of the CU address is determined through at least one syntax element in a parameter set, the parameter set being active for the picture to which the NAL unit header belongs.

7. A device for decoding a video sequence, the device comprising:
    at least one memory configured to store program code;
    at least one processor configured to read the program code and operate as instructed by the program code, the program code including:
        decoding code configured to cause the at least one processor to decode a binary coded CU address carrying an identification of a CU in a network abstraction layer (NAL) unit header comprising fixed length codewords;
        determining code configured to cause the at least one processor to determine, based on decoding the binary coded CU address in the NAL unit header, that the CU address is included in a list of CUs to be decoded; and
        reconstructing code configured to cause the at least one processor to reconstruct a CU based on determining that the CU address is included in the list of CUs to be decoded,
        wherein the NAL unit header includes only a nal_unit_type syntax element that indicates a type of data that a NAL unit carries, a nuh_cu_address syntax element that indicates the CU address, and a nuh_temporal_id_plus1 syntax element that indicates a temporal layer of a coded picture to which the NAL unit belongs.

8. The device of claim 7, wherein, for a given frame, each CU in the frame has a unique CU address, and the unique CU address is assigned in accordance with a scan order of a picture segment in the frame.

9. The device of claim 8, wherein the scan order is associated with a top left corner, and is increased by one following a top-to-bottom, right-to-left order.

10. The device of claim 7, wherein the CU address is in a fixed position in the NAL unit header.

11. The device of claim 7, wherein a size of the CU address is determined through a predefined value of a high level syntax structure syntax element in the same NAL unit header.

12. The device of claim 7, wherein a size of the CU address is determined through at least one syntax element in a parameter set, the parameter set being active for the picture to which the NAL unit header belongs.

13. A non-transitory computer-readable medium storing instructions, the instructions comprising: one or more instructions that, when executed by one or more processors of a device, cause the one or more processors to:
    decode a binary coded CU address carrying an identification of a CU in a network abstraction layer (NAL) unit header comprising fixed length codewords;
    determine, based on decoding the binary coded CU address in the NAL unit header, that the CU address is included in a list of CUs to be decoded; and
    reconstruct a CU based on determining that the CU address is included in the list of CUs to be decoded, wherein the NAL unit header includes only a nal_unit_type syntax element that indicates a type of data that a NAL unit carries, a nuh_cu_address syntax element that indicates the CU address, and a nuh_temporal_id_plus1 syntax element that indicates a temporal layer of a coded picture to which the NAL unit belongs.

* * * * *